Dec. 10, 1957 J. R. WATSON 2,815,584
GYRO COMBINING LIMITED FREEDOM AND ANGULAR RATE SENSITIVITY
Filed Nov. 30, 1953 3 Sheets-Sheet 3

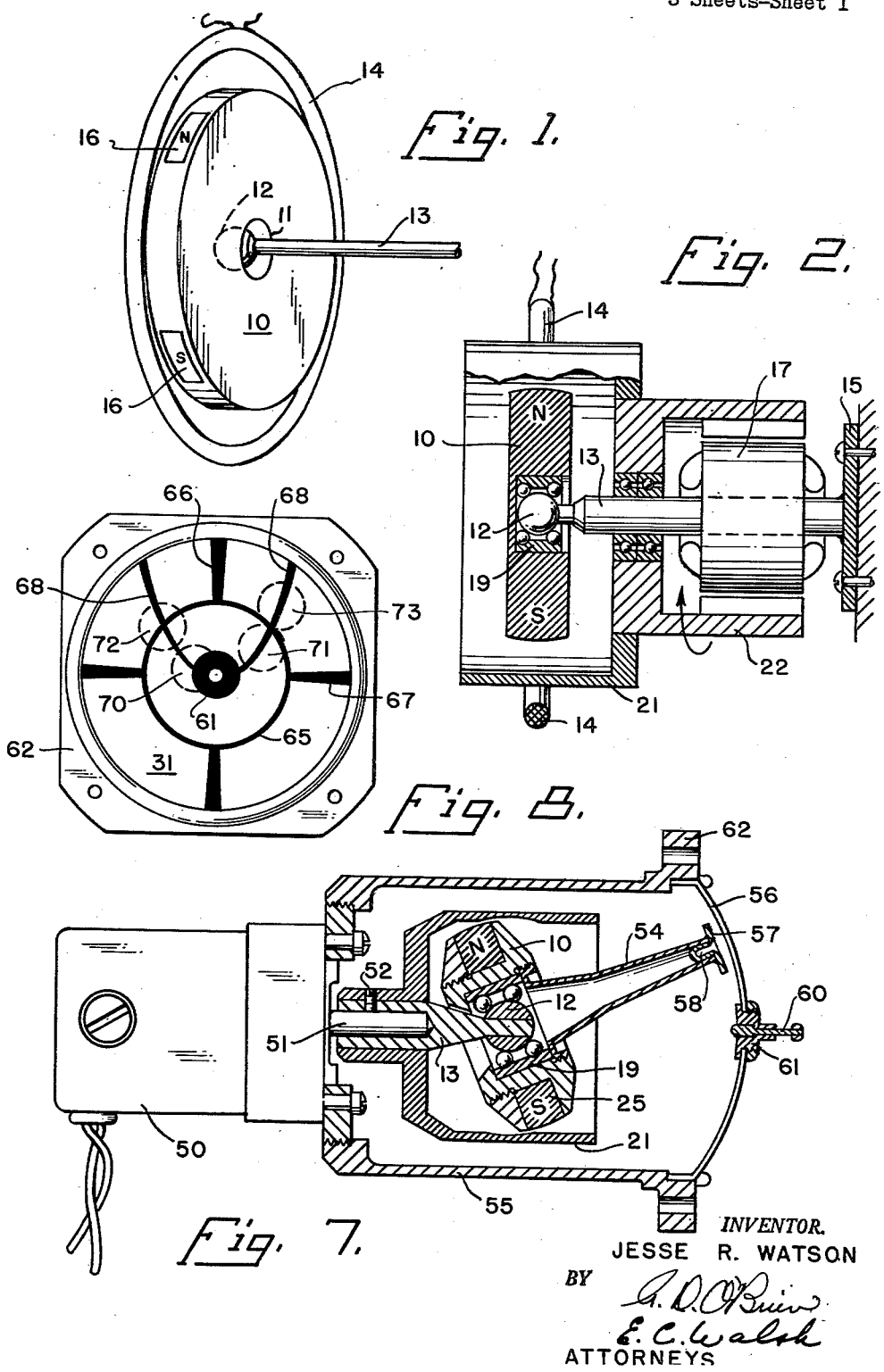

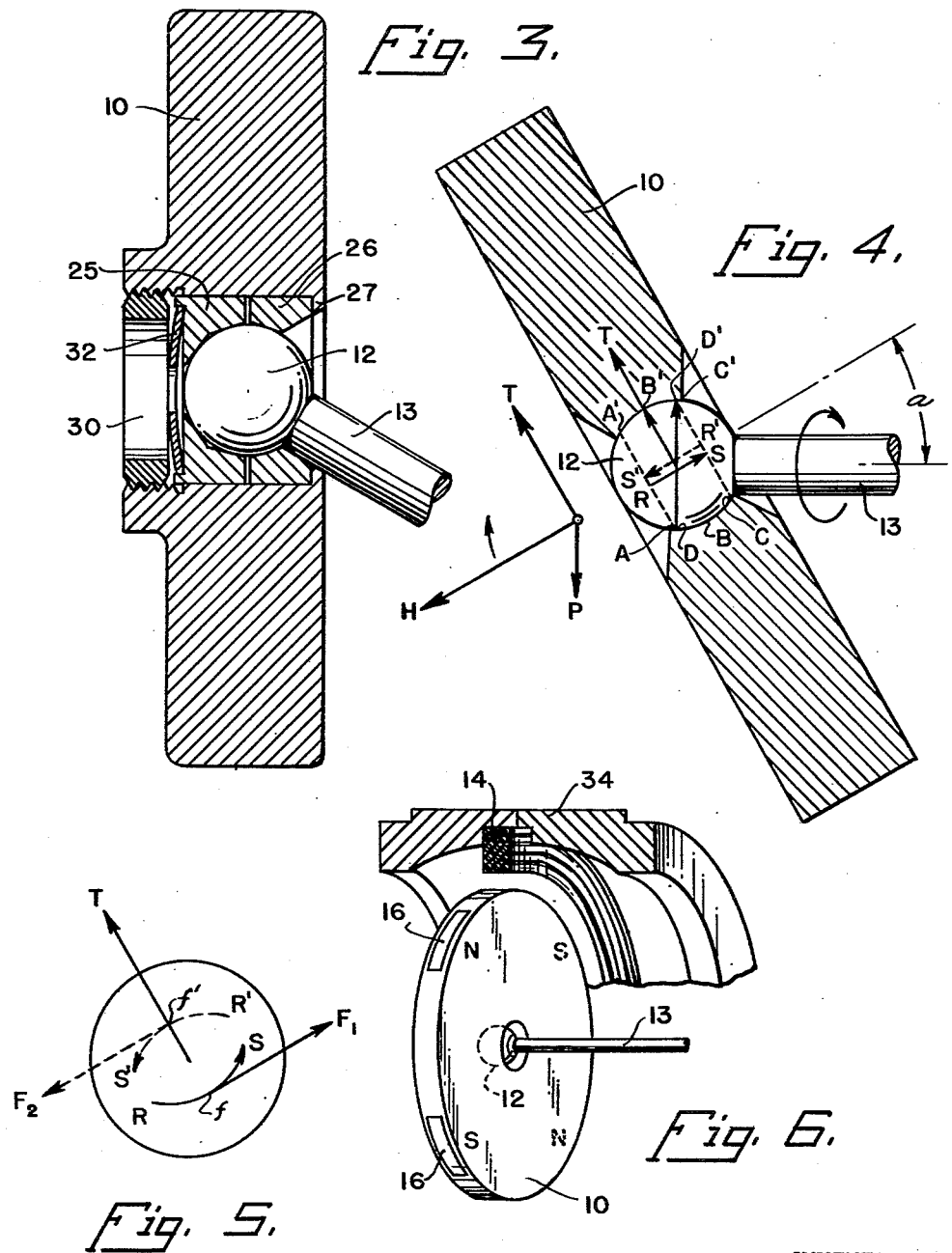

INVENTOR.
JESSE R. WATSON
BY
ATTORNEYS

United States Patent Office 2,815,584
Patented Dec. 10, 1957

2,815,584

GYRO COMBINING LIMITED FREEDOM AND ANGULAR RATE SENSITIVITY

Jesse R. Watson, China Lake, Calif.

Application November 30, 1953, Serial No. 395,327

8 Claims. (Cl. 33—204)

(Granted under Title 35, U. S. Code (1952), sec. 266)

The invention described herein may be manufactured and used by or for the Government of the United States of America for governmental purposes without the payment of any royalties thereon or therefor.

This invention relates to a gyroscopic device having improvements whereby, among other things, it is better adapted for use as a directional reference against which yawing or pitching oscillatory motion of a missile may be referred for measurement without respect to the plane of the motion. This represents one useful application of the invention. It may, of course, be used in many other applications including the guidance of missiles. Furthermore, the invention has very significant application in aircraft instruments; it may be applied in an instrument for measuring the rate of change of attitude of the aircraft as will appear hereinafter. In this instrument a group of indications of significant functions can be combined in a single instrument and an indication given on the face of the instrument which is an indication of the degree of co-ordination between the said functions. The indications which can be combined are indications such as "rate of turn," "degree of bank," "rate of pull-out," and coordination of these functions. The invention may of course have application in other types of vehicles; e. g., submarines, surface vessels, etc.

One of the significant features of the invention in certain forms when used as a directional reference as described, in a missile, is that the device is not affected by roll of the missile as have been similar devices of the prior art, with the result that a much less complicated telemetering record can be achieved.

In another form of the invention, oscillations of the missile may be indicated in terms of pitching and yawing for telemetering purposes. From these separate quadrature indications, roll of the missile may be readily deduced.

The second very significant characteristic of the device is its characteristic that it is a "following gyro," or "self-erecting gyro," that is, the device has a characteristic that the gyro axis will automatically follow and strive steadily to align itself with the axis of its driving member so that the gyro is always in the proper position to measure deviation with the gyro axis as a reference. This is due to an erecting, precessional torque, the magnitude of which increases as the deviation of the gyro axis from the driving axis increases.

Among other improvements in the device is the manner in which the displacement of the missile axis relative to the gyro axis is measured without physical connection to the gyro.

As will appear more in detail hereinafter, the gyro features a device wherein a gyro rotor is mounted on a spherical ball positioned at its center of gravity. In one form of the invention, the gyro may be driven frictionally through this spherical ball. In another form of the invention the gyro rotor is not driven by the spherical ball which is fixed, but by electrical means in the form of a rotating cylinder around the gyro rotor in which eddy currents are induced in the cylinder by magnets placed in the rotor so that the rotor is driven by a drag torque resulting from forces created by the interacting fields. Gyro rotor displacement is measured by voltages induced in a coil or coils surrounding the device by the rotating magnets in the rotor.

When the principles of the invention are embodied in an aircraft instrument, as referred to above, particularly advantageous use is made of the "following" characteristic of the device. Since the instrument is also a rate gyro and since it serves as a directional reference against which turning motion can be measured without respect to the plane of such motion, the device makes it possible to combine in an extremely advantageous manner in a single instrument indications representing various functions, such as rate of turn, pull-out or dive, and degree of bank and their coordination. These indications can be read on the face of the instrument by way of an indicator carried by the gyro relative to a pattern engraved on the face of the instrument. As an aircraft instrument it, therefore, makes possible, by using the instrument, the execution of perfectly coordinated evolutions of the aircraft as will appear more in detail hereinafter.

Pursuant to the foregoing, a primary object of the invention is to provide an improved gyroscope having the characteristics that it is a "self-erecting," or "following gyro"; that is, whenever the gyro mount and driving axis deviate from a predetermined position precessing forces are automatically set up within the gyro which force the rotor axis to precess in the direction of the deviation at a rate which is a function of the magnitude of displacement of axes, thereby making the angular displacement represent the rate of changing attitude.

As a corollary to the foregoing object, another object is to provide a gyroscope comprising a rotor mounted on a central spherical ball on a rotating shaft, the rotor being driven by frictional forces between the ball and the rotor.

Another object is to accomplish precession of the gyro such that the motion provides the following or erecting characteristic desired through the use of the frictional forces between the gyro wheel and the pivot ball support on the drive shaft, these forces having components in such directions as to provide a torque acting on the gyro wheel which increases with displacement of the drive shaft from the gyro wheel.

Another object is to provide a device as in the preceding objects wherein adjustable means are provided to adjust the degree of friction between the wheel and the mounting ball whereby the rate of precession can be controlled.

Another object is the provision of a gyro as in the foregoing wherein the rotor has peripherally positioned permanent magnetic poles cooperating with an electrical coil or coils surrounding the gyro.

Another object is to provide a modified form of the device as referred to in the foregoing objects wherein a housing is provided around the gyro wheel and a pick-off coil is provided from a molded or laminated magnetic material the purpose of which is to better confine the magnetic field from the magnetic poles in the rotor and to conduct the flux around the outside of the coil thereby reducing the overall reluctance of the magnetic path and consequently increasing the precessing torque on the gyro and signal picked up in the coil.

Another object is to provide a gyro mounted on a central spherical ball using ball bearings wherein the gyro is driven by means of an enclosing rotating cylinder wherein currents are induced by magnets rotating with the gyro rotor, the interacting fields producing drag forces resulting in a torque which causes the rotor to rotate with the cylinder.

Another object of the invention is to achieve the result in the device of the foregoing objects that the interacting fields produce torque forces which have components at right angles to the axis of the gyro wheel and in such direction as to produce precession in the correct direction so that its axis realigns itself with that of the driving shaft axis.

Another object of the invention is to provide an alternate arrangement comprising a plurality of pick-off coils so arranged that the telemetering signal received from the coils at a ground station can be utilized to deduce whether or not the missile rolled.

Another object of the invention is the incorporation of the "following gyro" principle in an aircraft instrument wherein an indicator is mounted on the rotor axis and it moves relative to a pattern engraved on the face of the instrument to indicate rates of turn, pull-out, degree of bank, and coordination of turn and bank.

Another object of the invention is to provide an aircraft instrument as in the foregoing object wherein the pattern on the face of the instrument comprises essentially a central spot, a concentric circle surrounding the spot, vertical and horizontal indexes, and a pair of curved lines extending from a central spot upwardly and outwardly, the pattern being such as to indicate a coordinated maneuver or evolution, depending upon the position of the indicator spot behind the pattern.

Further objects and numerous advantages of the invention will become apparent from the following detailed description and annexed drawings wherein:

Fig. 1 is a schematic view of one form of the invention.

Fig. 2 is a diagrammatic view of a modified form of the invention, wherein the gyro rotor is driven in a different manner.

Fig. 3 is a view of a modification wherein the friction between the gyro wheel and its center ball mounting may be adjusted.

Fig. 4 is an illustration of an analysis of the mechanics of the precessing forces involved in the device of Fig. 1.

Fig. 5 is a further illustration of the analysis of Fig. 4.

Fig. 6 is a view of a modified form of the invention of Fig. 1.

Fig. 7 is a view partly in section of another form of the invention in which its principles are applied to an aircraft turn and bank indicator.

Fig. 8 is a view of the face of the instrument of Fig. 7.

Figure 9:
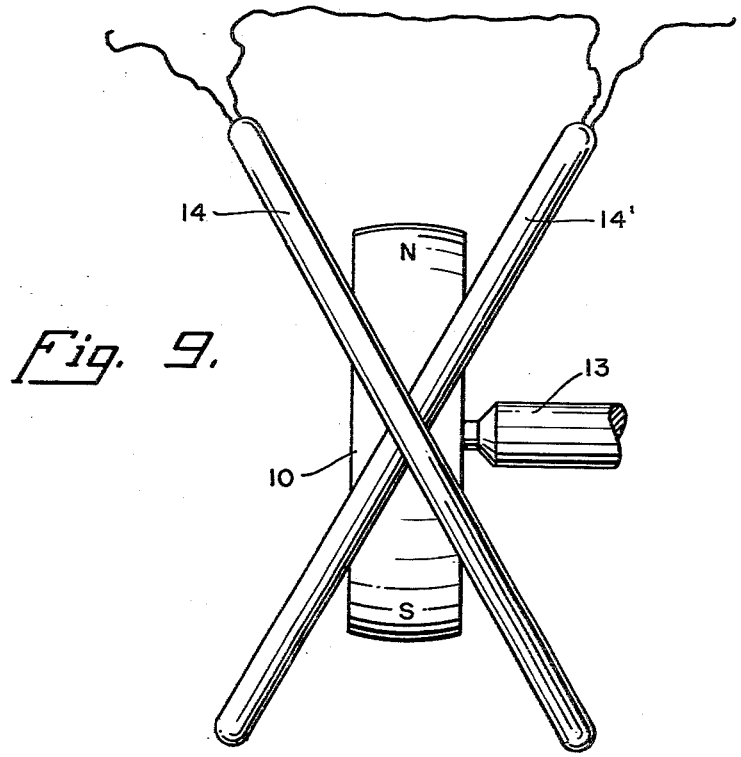
Fig. 9 is a view of a modified form of pickup arrangement.

Referring now more particularly to Fig. 1 of the drawings, numeral 10 designates a gyro wheel or rotor having a central, spherical cavity 11 whereby the wheel is mounted on spherical ball 12 mounted on the end of the drive shaft 13. Drive shaft 13 is driven by any suitable driving means and the drive is imparted to the wheel 10 through the adjustable friction between ball 12 and the cavity in the wheel 10.

The structure illustrates a principle intended for application, for example, in missiles for indicating the period of yaw or pitching oscillations of the missile. It can also be used to indicate the magnitude of yaw or pitch oscillation. As pointed out in the foregoing, the gyro serves as a space reference relative to which the oscillations can be measured either without regard to the plane in which the oscillation occurs as in Fig. 1, or as yaw and pitch as will be described in connection with another form of the invention. As pointed out in the foregoing, this is to be distinguished from the situation wherein the gyro rotor is mounted in conventional gimbals.

The particular action of the gyro, as so far described, is that whenever the plane of the wheel 10 is in a position other than normal to the axis of the shaft 13, the frictional forces between the ball 12 and its socket set up precessing torques, which are in exactly the right direction to cause the wheel to precess to realign its axis with that of the shaft 13. The actual precessional rate at which the wheel returns to alignment is relatively slow such that for rapid oscillatory motions of the driving axis 13 such as would be produced by yawing of the missile, there is very little displacement of the rotor axis in space and the yaw oscillation may be measured against the gyro rotor as a relatively free reference. On the other hand, during the flight of a missile there is a slow drift of its axis in conformity with its trajectory and in this situation the axis of the gyro wheel due to precession will follow and approach alignment of itself with the driving axis 13. The gyro, as thus described, may be accordingly referred to as a "following" or "self-erecting" gyro. This following motion of the gyro keeps the center of its available angular freedom near the direction of the driving axis, thus allowing for maximum range of oscillatory measurement.

The mechanics involved in the precessing forces whereby the axis of the gyro wheel is caused to be precessed so that this axis realigns itself with the axis of the drive shaft is illustrated in Figs. 4 and 5. In Fig. 4 there are three mutually perpendicular vectors indicated by the letters, H, T, and P. The vector indicated by the letter H is the one representing angular momentum. The vector represented by T is a torque vector through the center of the gyro wheel representing a precessing torque. The vector P represents the axis of precession mutually perpendicular to the vectors H and T. In Fig. 4 with reference to the points designated A, B, C on the inside of the gyro wheel adjacent the ball 12, it will be observed that when the wheel rotates through 180°, these points assume positions as designated at A', B' and C'. As far as friction is concerned, when the wheel makes this half revolution the effect is similar to that of swinging the shaft 13 through twice the angle ($a$). As this relative oscillation takes place any two points as D and D' opposite each other along a diametrical line through the ball normal to the drive axis will reciprocate along a line as A, B, C and C', B', A' on the inside surface of the wheel cavity producing frictional forces tangential to this surface. These forces are acting in one direction, as RS, on one side of the ball and in the opposite direction, as R' S', on the opposite side (Fig. 5). The mean of these forces, $F_1$ and $F_2$ times the diameter of the spherical surface is a force couple that acts on the gyro wheel. The torque vector, T, is the vector sum of all such force couples produced by friction between the ball and wheel cavity and lies in the plane of the angle, and in the correct direction to cause the precession P. The precession P is in such a direction as to move the vector H toward the vector T, or, in other words, to cause the axis of the gyro wheel to be realigned with the axis of the shaft 13.

Means are provided for measuring the displacement of the rotor axis, or, in other words, the displacement of the driving axis 13 relative to the rotor axis. This structure includes in the present form of the invention, a single short solenoid 14 of several hundred turns of wire disposed about the rotor 10, its axis coinciding with the drive axis 13. The rotor is formed so as to have a plurality of poles illustrated in Fig. 1, the poles being indicated at 16. As these poles rotate the rotating magnetic field induces an alternating voltage in the coil 14, which has a frequency determined by the spin rate of the gyro and the number of poles, and a magnitude which is a function of the sine of the angle between the gyro axis and the coil axis and of the characteristics of the coil and the magnetic field. In other words, this voltage signal will be a measure of the displacement of the rotor axis from the drive axis which is a measure of the magnitude of the yaw. When this signal is telemetered to a ground station, the yaw period is, of course, readily determinable by reading the signal curve against a time base.

It can be seen that when the gyro, as described in the foregoing, is used for missile oscillation measurement where there is no distinction between pitch and yaw, as in symmetrical rockets, it has the advantage that the roll of the missile has no bearing on the signal given and the results are not complicated by slow angular change of the gyro axis relative to the missile axis, as the gyro axis follows changes of the driving axis during the progress of the missile along its trajectory. Where missile oscillation is to be measured as pitch and yaw relative to the missile another arrangement of the invention is provided wherein separate pick-off coils for vertical or pitch and lateral or yaw oscillations are utilized and separately connected to their respective telemetering or other recording gear. This arrangement is shown in Fig. 9 wherein pick-off coils 14 and 14' are represented for oscillations in one plane. A similar pair (not shown) are provided for the other plane of oscillation. The coils as shown are connected in opposition and deviation of the rotor 10 in either direction from mid position as shown causes a signal to be generated.

Fig. 2 shows an improved arrangement of the gyro and its mounting whereby certain additional advantages can be realized. In Fig. 2 the rotor 10 of the gyro is similarly mounted on a central, spherical ball 12, but it is not driven frictionally by the ball, as in Fig. 1. The rotor 10 of Fig. 2 has a central double row ball bearing 19 and the spherical ball 12 forms a stationary inner race for this ball bearing which is of the inverted, self-aligning type. The outer race of the ball bearing is carried by and supports the gyro wheel. In the arrangement of Fig. 2, the friction in the support of the gyro wheel is kept at a minimum and the orientation of the spherical ball has no influence on the gyro wheel as in Fig. 1. The gyro rotor 10 has peripheral poles formed by permanent magnets as in Fig. 1.

For driving the rotor of Fig. 2, there is provided a copper cylinder 21 which is free to revolve about its axis which coincides with the mounting axis or shaft 13 of the spherical ball 12 and is supported on a bearing as shown. The shaft 13 is rigidly supported as shown at 15 and it carries a stationary cylindrical field winding as shown at 17. Winding 17 is within a hollow cylindrical armature 22 attached to cylinder 21 as shown for driving it. Winding 17 and armature 22 form a constant speed motor. A pick-off coil 14 is provided as in Fig. 1 and the copper cylinder 21 is interposed between the gyro wheel 10 and pick-off coil 14.

When the copper cylinder is driven about its axis, eddy currents set up within the copper react upon the field producing them and cause a drag torque which is a function of the relative speed of the cylinder with respect to the gyro wheel. In other words, the drag torque caused by these interacting fields reacts on the magnetic poles thereby dragging the gyro wheel around with the cylinder. At a cylinder speed of 10,000 R. P. M., it was found that the gyro wheel in a particular model of the invention ran at 7500 R. P. M. The precession forces which are set up in Fig. 2 and which cause the gyro rotor to realign its axis with that of the axis 13 are set up in a different manner than in Fig. 1. When the axis of the gyro wheel 10 makes an angle with the axis of the cylinder 21 as a result of yawing of a missile, for example, the magnetic drag forces which drive the rotor wheel have components at right angles to the wheel and these components produce precessing torques, which precess the gyro wheel to cause it to realign its axis with that of the shaft 13 as in Fig. 1 in a manner analogous to that explained in connection with Fig. 4.

In measuring the yaw period of a missile, a signal is induced in a pick-off coil 14 in the same manner as in Fig. 1 and the yaw period and magnitude may be determined from a recorded signal at a telemetering station on the ground.

From the foregoing, those skilled in the art will observe that I have provided a simple but adequate system for yaw period measurement adapted for installation and use in small missiles. The system gives a simple signal response which is uncomplicated by roll of the missile or by angular change of the missile axis during flight. The use of angular quadrature pick-offs with sliding contacts, as previously used on gimbal mounted gyros, is avoided. Only a single telemetering channel need be used rather than two channels, as previously required for telemetering quadrature readings, unless pitch and yaw are to be distinguished.

Refering now to Fig. 3 of the drawings, this figure shows an arrangement whereby there is means for adjusting the friction between the mounting ball 12 and the gyro wheel 10. The wheel 10 has a central bore in which are mounted inserts 25 and 26 as shown. The insert 26 is held in place against a retaining flange 27 by a force transmitted through the ball 12 and insert 25 from the spring 32. The insert 26 and flange 27 are shaped to allow for angular movement relative to the shaft 13 of the ball 12. A nut 30 engaging in a threaded bore on the wheel 10 bears against a spring clamping ring 32 which bears against the insert 25 as shown. By adjusting the nut 30 the pressure which the insert 25 exerts against the ball 12 can be adjusted and accordingly the friction between the wheel 10 and the ball 12 is adjusted. By adjusting this friction, the rate of precession of the device can be controlled.

Referring to Fig. 6 of the drawings, a form of the invention is shown wherein a housing 34 is provided to better control the magnetic flux from the poles of the gyro wheel. This housing may be utilized with the form of the invention shown in Fig. 1, or the form shown in Fig. 2 wherein the copper cylinder 21 is utilized. The housing 34 is of molded powdered iron or laminated construction to better confine the field and reduce the overall reluctance of the field path. The effect of the housing 34 is to conduct the magnetic flux about the outside of the coil and to thereby improve the performance, by reducing the reluctance of the magnetic path.

Referring now to Fig. 7 of the drawings, this figure shows an aircraft instrument embodying the principles of the devices shown in Figs. 1 and 2 and having additional features and advantages. The instrument of Figs. 7 and 8 may be described as a "rate of change of attitude indicator" or "universal turn indicator" for aircraft; it is an instrument in which are combined indications of "rate of turn," "bank," and "rate of pull out" functions. The indication of the instrument is presented on a dashboard dial in the form of motion of a bright dot behind a fixed pattern etched or inscribed on the face of the instrument. By reason of combining these functions in a single instrument and the manner in which the face of the instrument is inscribed, the instrument can serve as a very convenient and useful device for achieving precisely coordinated evolutions in the maneuvering of an aircraft. In other words, in a perfectly coordinated evolution there is a particular relationship between air speed, degree of bank, radius of turn, etc. The instrument of Figs. 7 and 8 is such that perfect coordination of the evolution may be achieved by watching the position of the bright dot referred to above and maneuvering the airplane so that the dot is at all times kept bisected by the curve 68 as part of the pattern inscribed on the face of the instrument, as shown in Fig. 8.

In Fig. 7 the gyro wheel 10 is similar to that of Fig. 2 having a similar central bearing mounted on a spherical ball 12. The wheel has peripheral magnets 25 and the copper cylinder 21 is driven by a constant speed electric motor 50 through a shaft 51 to which the cylinder is attached by means of a screw 52 as shown. In this case the central ball turns at the same speed as the cylinder 21 but the outer raceway of the bearing 19 carried by the rotor turns at a rate sufficiently slower than the ball to give the bearing angular freedom. An alternate method of driving cylinder 21 would be to attach it to the armature of a motor in which the armature forms the outer rotating part and in which the field or stationary part is the inner structure including the central shaft extension 13 which would in this case hold the ball 12 stationary as in Fig. 2. The rotor wheel 10 has a central axially aligned extending stem 54 screw threaded into the wheel as shown. The parts, as so far described, are enclosed symmetrically within an instrument housing 55 having a convex face as shown at 56. The end of the stem 54 which carries an indicator disc 57 moves adjacent to the interior of the face 56. The disc 57 has a central depression 58 in which may be engaged a reciprocable plunger 60 for caging the gyro, the plunger 60 operating in a fitting 61 centered in the face 56. The housing 55 has mounting lugs or brackets 62.

Fig. 8 shows the manner in which the face 56 of the instrument is etched or inscribed. It has a concentric circle 65 which bears the legend, turn rate index, which provides an index relative to which the rate of turn is indicated by the position of the disc 57. The face 56 has a vertical index 66 and a horizontal index 67, which divide the face into four quadrants as an aid to the pilot in judging direction and kind of maneuvers. The curves 68 extending from the center of face 56 towards its periphery provide a turn coordination index and in a perfectly coordinated evolution, that is, a turn the indicator disc 57 will follow one of these curves.

The essential operation of the device of Fig. 7 is similar to that of Fig. 2 in that whenever the axis of the gyro wheel 10 is displaced from the axis 13 which is parallel to the longitudinal axis of the aircraft, precessing forces are set up which will tend to realign these axes. In other words, these forces will tend to return the disc 57 to the center of the pattern of face 56 of the instrument. Whenever the disc 57 is away from the center of the pattern the aircraft is changing its attitude and the distance that the disc is away from the center indicates the rate of change of attitude. When the disc 57 emerges from behind the central dot 61 indicating a turn there are four discrete positions which may readily be recognized and interpreted as four discrete values of rate of turn, once they are evaluated for a given airplane. These four positions are shown in dotted outline in Fig. 8, as half emerged at 70 and fully emerged, and contacting circle 65, in various positions at 71, 72 and 73. When the airplane is changing attitude, disc 57 will be displaced from behind the central spot 36 in the direction of the turn whether it be a horizontal turn, a climbing or diving turn, or a straight pull-up or dive. The horizontal index of the pattern serves to indicate the angle of bank by making an angle with the direction of displacement of the indicator disc.

The angle of bank in a properly coordinated turn is determined by the air speed and the rate of turn so that the coordination guide lines 68 shown in Fig. 8 are for an airplane having a particular cruising speed.

The use of this instrument with a simple ball bank indicator can effectively replace two conventional gyro instruments—the rate of turn indicator and the artificial horizon.

From the foregoing description of the invention, particularly in connection with its adaptation in an aircraft instrument, it will be observed that the gyro has the characteristic that it is "self-erecting." In other words, whenever the aircraft maneuvers so that the stem 54 is not aligned with the axis of the shaft 51, the stem 54 will, as a result of precession of the gyro strive automatically to realign itself with the said axis. If the rate of maneuver, or turn of the aircraft is maintained constant there will be a constant deflection of the stem 54 and spot 57 which will be a measure of the magnitude of the rate. From the foregoing, it is to be observed that it is not necessary to manually cage the gyro in a central or other predetermined position because the gyro itself inherently assumes this position when left to do so. The plunger 60, which is adapted to engage in the dimple 58 in the stem 54 is actually simply a device for holding the gyro in a fixed position when desired, as in violent maneuvers. It is to be observed further that when the plunger 60 engages in the dimple 58 and applies a force against the side of this dimple, the gyro will precess in a direction resulting to move away from the force applied. In other words, the gyro will not resist any force applied in this manner to center it or otherwise move it in a given direction. Instead, the gyro actively responds to any pressure applied in this manner to readily be "led" in the desired direction.

What is claimed is:

1. In a gyroscope, in combination; means comprising a rotor, a mount for said rotor having a spherical ball, said rotor being mounted to rotate around said spherical ball, the rotor having a double row ball bearing cooperating with the ball providing a frictionless mounting, a rotatable hollow copper shell mounted on said rotor mount and surrounding the rotor, means for rotating said shell, said rotor having substantially peripherally positioned permanent magnet poles whereby eddy currents are induced in the copper shell and the interacting fields of the eddy currents and magnets produce drag torques whereby the rotor rotates at a speed approaching that of the shell, said drag torques having components normal to the plane of the rotor when its axis is out of alignment with that of the copper shell, these components constituting precessing torques which tend to return the rotor axis to alignment with that of the shell.

2. The structure of claim 1 including mounting means and an electrical winding supported thereby surrounding the copper shell in which signals are induced by the rotating magnetic fields which are indicative of the angle of the rotor axis relative to the winding axis.

3. In a gyroscope, in combination, a base, means comprising a rotor, means mounted on said base for mounting the rotor for rotation and for swivel motion about its center of gravity in response to gyroscopic forces, said rotor having substantially peripherally positioned permanent magnet poles, a hollow shell of electrically conductive material surrounding said rotor and mounted on said rotor mounting means for rotation about its own axis, and means to rotate said shell, whereby eddy currents are induced in the shell by movement past said magnetic poles and the interacting fields of such eddy currents and the magnets produce drag torques which cause the rotor to rotate at a speed approaching that of the shell, said drag torques having components normal to the plane of the rotor when the rotor axis is out of alignment with that of the shell, these components constituting precessing torques which tend to return the rotor axis to alignment with that of the shell.

4. The gyroscope of claim 3, in which the shell is substantially cylindrical in form and is made of copper.

5. The gyroscope of claim 3 having also means mounted on said base to give an indication of the angle of the rotor relative to an axis fixed relative to said base.

6. The gyroscope of claim 5, in which the indicating means includes an electrical winding, fixed relative to said base and positioned to surround the cylinder, and in which induced voltage is varied by variations in the angle the rotor axis makes with the axis of symmetry of the electrical winding.

7. The gyroscope of claim 5 in which the indicating means comprises an extended stem aligned with the axis of said rotor and attached to the rotor for movement therewith, and a dial positioned adjacent the free end of said stem, said dial having a transparent face with indicia inscribed thereon.

8. The gyroscope of claim 7, in which the indicia comprise a central spot indicative of normal non-accelerated motion, an intermediate concentric circle around said spot and curves extending from said central spot outwardly to the periphery of said face, the shape of the curves being such as to indicate a properly executed performance when followed by the end of the stem.

References Cited in the file of this patent

UNITED STATES PATENTS

| | | |
|---|---|---|
| 1,860,230 | Brown | May 24, 1932 |
| 1,890,831 | Smyth | Dec. 31, 1932 |
| 1,987,483 | McDonald | Jan. 8, 1935 |
| 2,005,379 | Marcus | June 18, 1935 |
| 2,124,817 | Fieux | July 26, 1938 |
| 2,146,620 | Brown et al. | Feb. 7, 1939 |
| 2,452,335 | Stoner | Oct. 26, 1948 |
| 2,590,428 | Noxon | Mar. 25, 1952 |

FOREIGN PATENTS

| | | |
|---|---|---|
| 546,013 | France | Aug. 7, 1922 |
| 871,563 | France | Jan. 19, 1942 |
| 971,418 | France | July 19, 1950 |